March 7, 1967 — R. C. BERGSTROM — 3,307,499
DISPENSING APPARATUS

Filed Nov. 5, 1963 — 4 Sheets-Sheet 1

Inventor
Roger C. Bergstrom
By McCanna, Morsbach & Pillote
Atty's

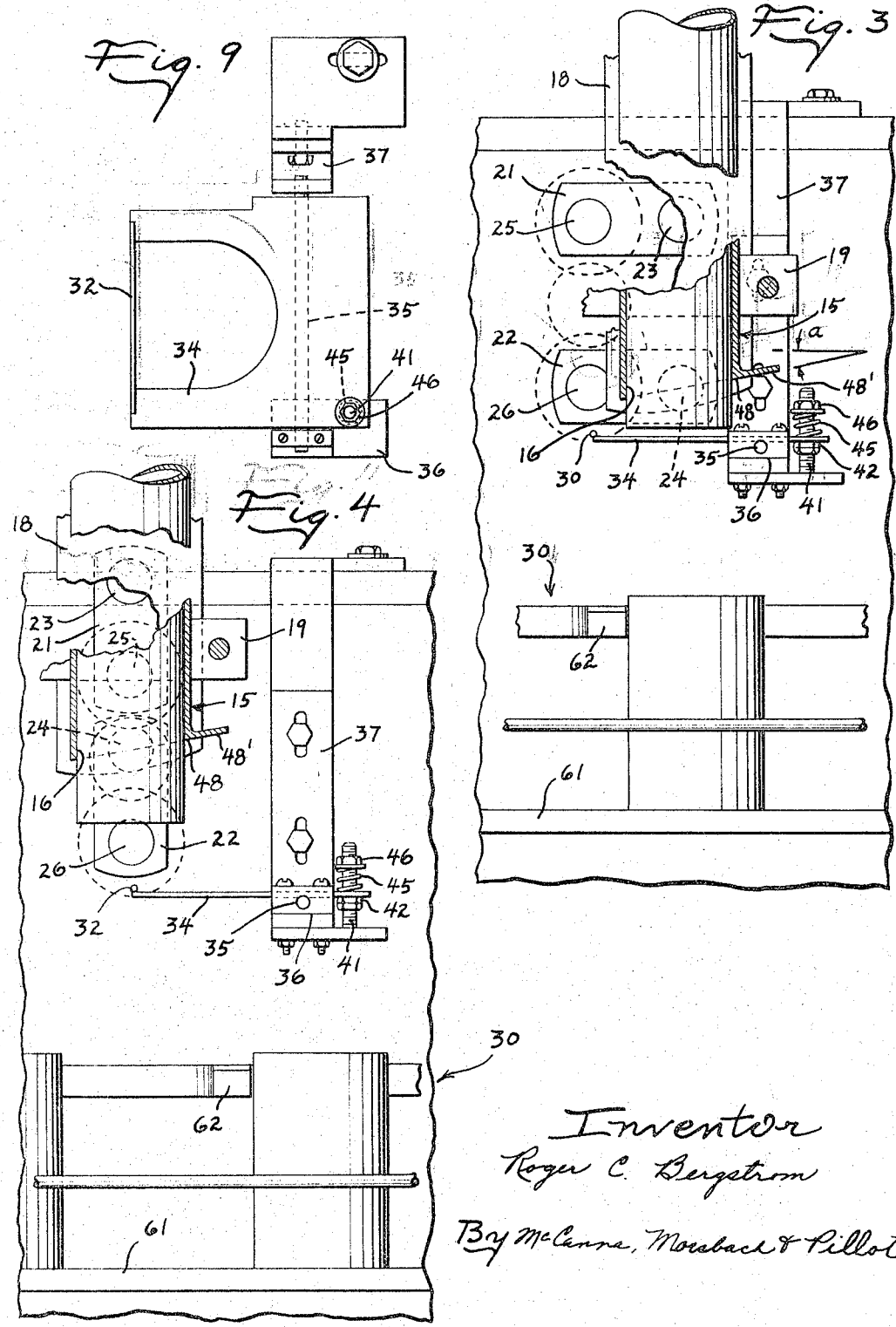

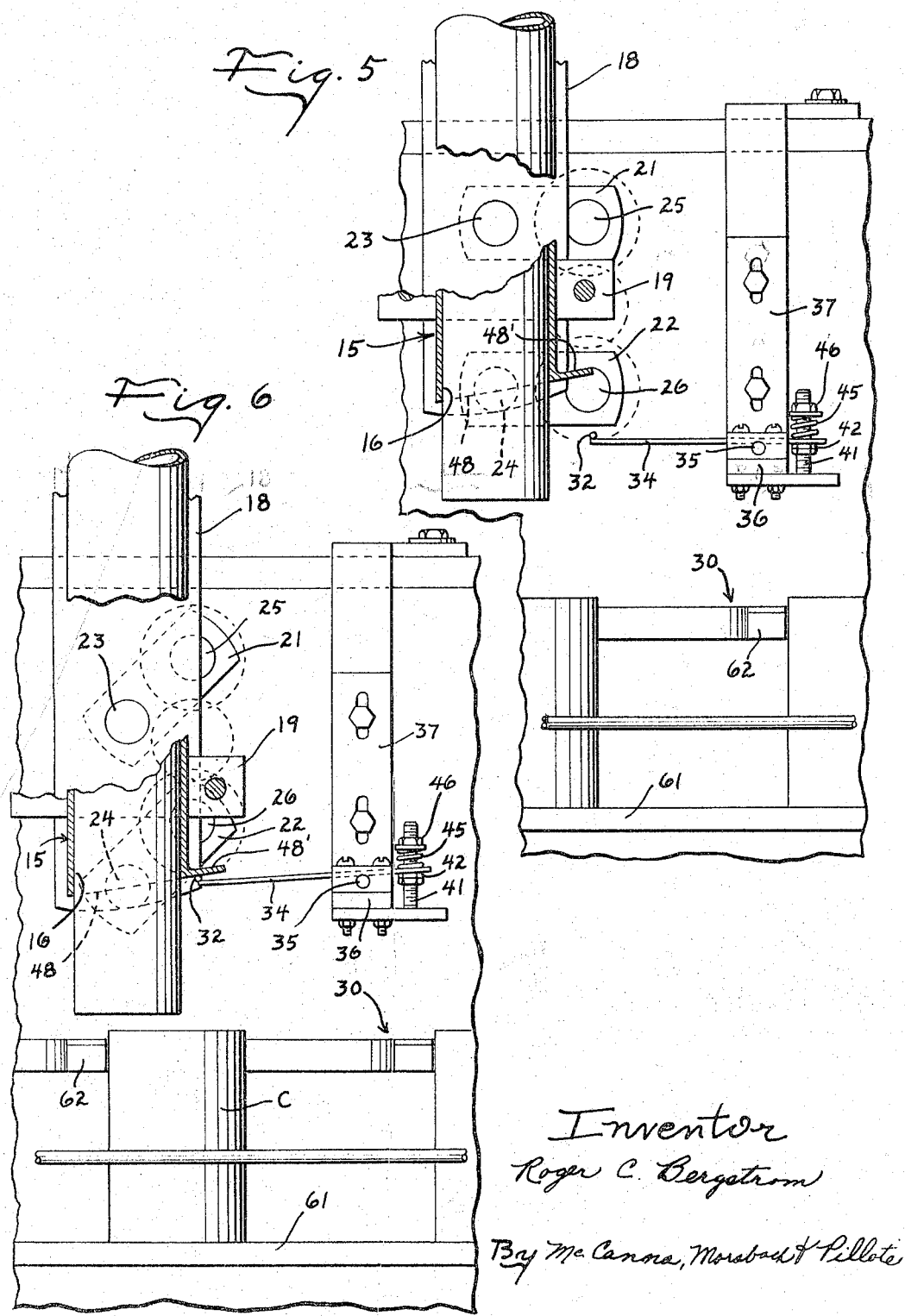

March 7, 1967 R. C. BERGSTROM 3,307,499
DISPENSING APPARATUS
Filed Nov. 5, 1963 4 Sheets-Sheet 4
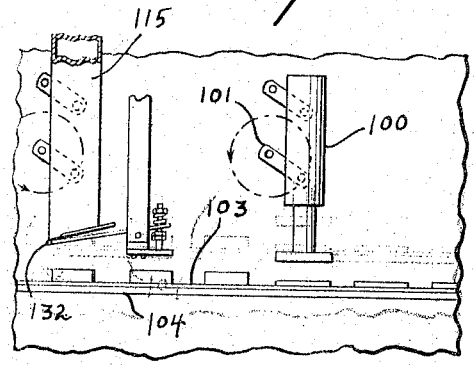
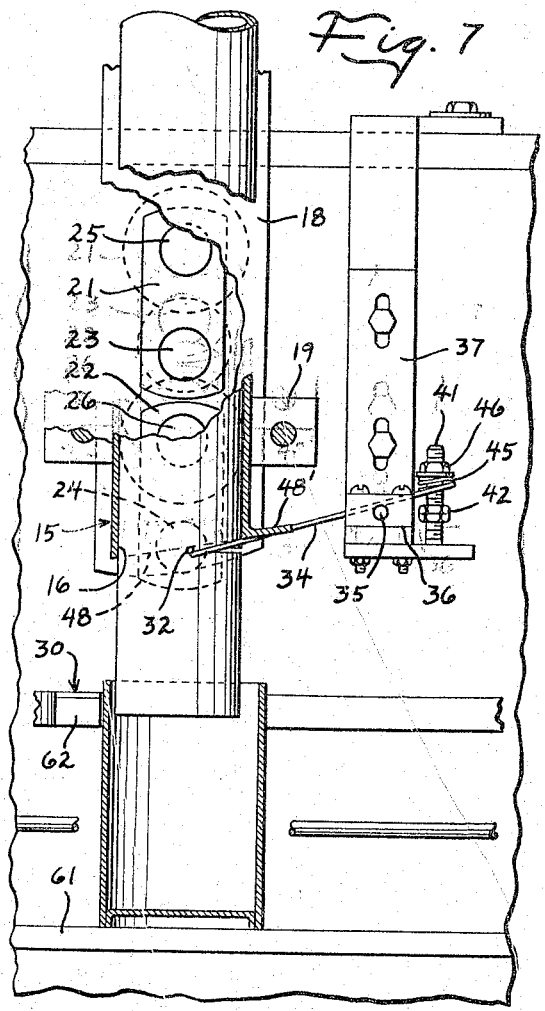
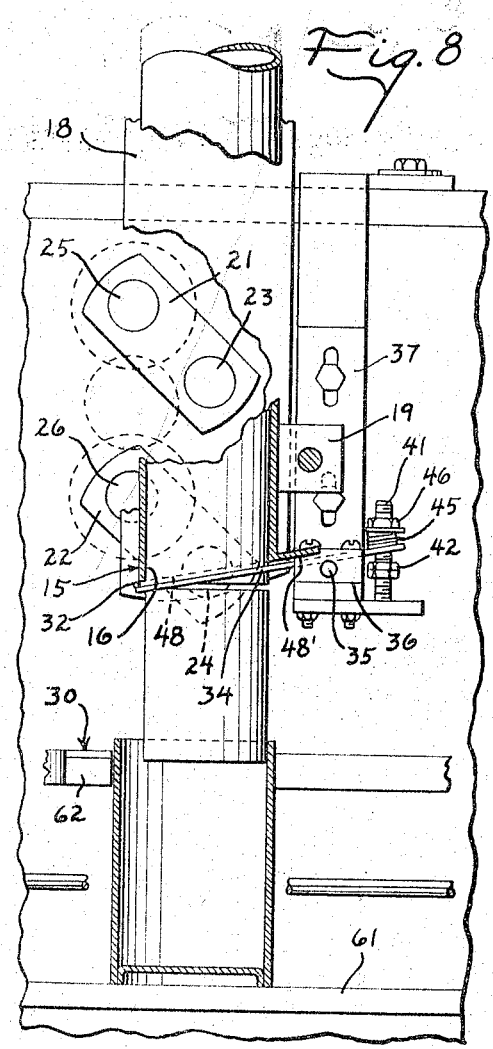
Inventor
Roger C. Bergstrom
By McCanna, Morsbach & Pillote
Atty's

United States Patent Office 3,307,499
Patented Mar. 7, 1967

3,307,499
DISPENSING APPARATUS
Roger C. Bergstrom, Rockford, Ill., assignor to Anderson Bros. Mfg. Co., Rockford, Ill., a corporation of Illinois
Filed Nov. 5, 1963, Ser. No. 321,475
12 Claims. (Cl. 107—4)

This invention relates to material dispensing and particularly to an improved apparatus for dispensing discrete charges of materials.

An important object of this invention is to provide an improved apparatus for dispensing discrete charges of material.

Another object of this invention is to provide an improved apparatus for dispensing charges of material onto a moving charge receiver, and in which the charge of material is moved in the same direction as the charge receiver at the time it is dispensed thereon.

Yet another object of this invention is to provide apparatus for dispensing charges of material from a continuous web of material and wherein the charge of material is lowered into close proximity to the charge receiver prior to severance of the charge from the web to deposit the charge on the receiver with a minimum of free fall and thereby minimize distortion of the shape of the charge.

A further object of this invention is to provide apparataus for dispensing discrete charges of material in which a web of material is continuously fed from a material guide and discrete charges of material are then severed from the continuously flowing web in such a manner as to avoid momentary interruption in the flow of material from the material guide.

Yet a further object of this invention is to provide apparatus for severing discrete charges of material from a continuously flowing web of material, and which compensates for the travel of the web during severance of the charges therefrom to form end faces on the charge that extend substantially perpendicular to the axis of the charge of material.

Various other objects of this invention are to provide an apparatus for dispensing discrete charges of material, which apparatus can be operated at high speeds; which is a simple and economical construction; and which can be readily cleaned.

These, together with other objects and advantages of this invention will be more readily appreciated as the invention becomes better understood by reference to the following detailed description when taken in connection with the accompanying drawings wherein:

FIGS. 3, 4, 5, 6, 7 and 8 are fragmentary views shown partially in elevation and partially in section, and illustrating the dispensing apparatus in different moved positions thereof;

FIG. 9 is a plan view of the cutter for severing charges of material from the web; and FIG. 10 is a fragmentary view illustrating a modified form of this invention.

Figure 1:
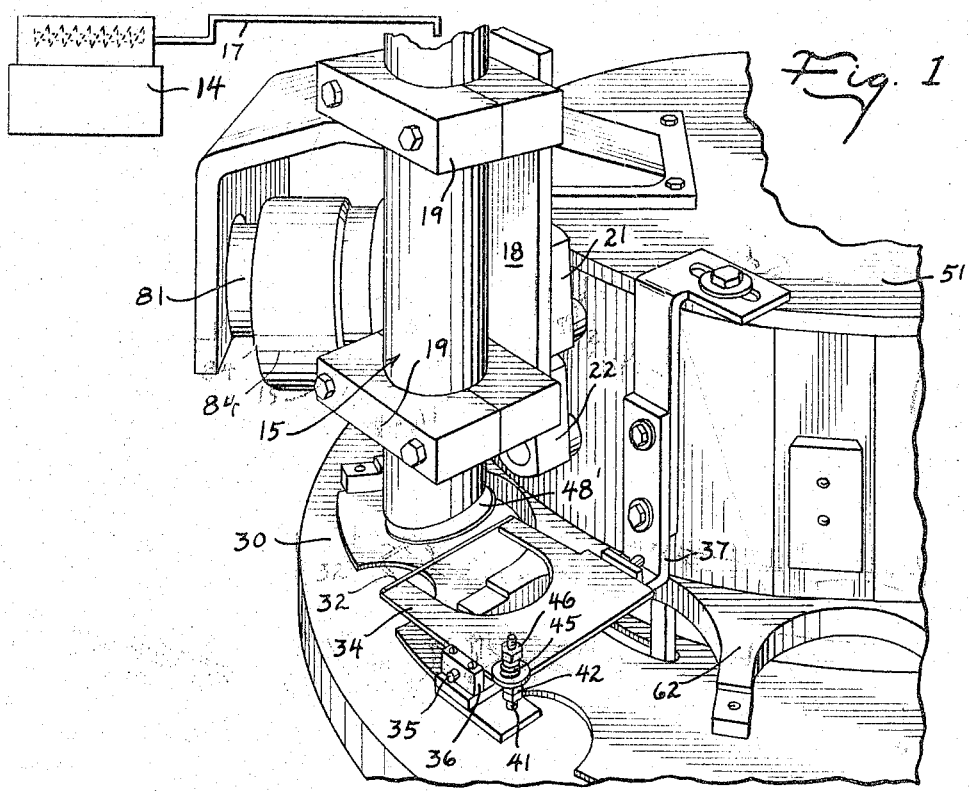
FIGURE 1 is a fragmentary perspective view of a filling machine embodying the dispensing apparatus of the present invention.

The apparatus of the present invention relates to dispensing of discrete charges of material from a material guide having a discharge opening and onto a charge receiver. The material is preferably in a semi-solid state and the material guide is preferably in the form of a nozzle which guides and extrudes a continuous shaped web of material from the discharge opening. The material guide is moved in an orbital path while maintaining the discharge opening facing generally downwardly, and a cutter is positioned to intersect the path of movement of the web of material as the material guide moves through a portion of its orbital path to sever a charge of material from the web. The dispenser can be used to discharge onto a stationary charge receiver. However, the dispenser is particularly adapted to dispense the charges onto a receiver that is moving in a generally horizontal plane, and the orbital path in which the material guide moves is preferably disposed generally vertically so that the material guide moves toward and away from the receiver as it moves in the orbital path. The direction of movement of the material guide is preferably correlated with the direction of movement of the receiver so that the material guide and receiver are moving in the same direction at the time when the material guide approaches the receiver. The cutter is advantageously guided across the end of the material guide, as the material guide moves through a portion of its orbital path, and in such a manner as to compensate for the movement of the web of material during cutting of the charge from the web, to thereby produce end faces on the charge which are substantially perpendicular to the axis of the same.

Referring more specifically to the accompanying drawings, the dispensing apparatus includes a tubular material guide 15 herein shown in the form of a nozzle and having a discharge opening 16 at one end. The material guide may have any desired cross-sectional configuration to impart a preselected cross-sectional shape to the web of material, and, in the embodiment shown in FIGS. 1–9, has a round cross-section. It is apparent that the cross-section of the material guide, adjacent the discharge end, may be square, rectangular, oval or polygonal, etc. In a particular embodiment illustrated, the material guide is in the form of an elongated tube and has a connection (not shown) at its upper end which is connected to a supply line 17 which leads to an apparatus 14 for continuously feeding material to the material guide. The apparatus 14 may be of various different constructions, depending in part upon the material being dispensed, and may, for example, be a continuous type freezer for producing and feeding semi-solid comestibles such as ice cream and the like. Although the material guide is herein shown in the form of an elongated tube, it is to be understood that the material guide can be made relatively shorter, if desired.

The material guide 15 is moved in an orbital path while the discharge opening 16 of the material guide is maintained in a downwardly facing position. As shown, the material guide is supported on a bracket 18 by clamps 19 and the bracket is moved in a generally upright plane through an orbital path by means of cranks 21 and 22. The cranks are rotatably connected to the bracket 18 by vertically spaced pivot axes 23 and 24, and the cranks are themselves mounted for rotation about vertically spaced axes 25 and 26. The cranks are preferably rotated in unison so as to move the bracket and material guide in an orbital path while maintaining the material guide in a generally upright position. One suitable drive arrangement is described more fully hereinafter.

As previously mentioned, the dispenser can be used to discharge discrete charges of material into a stationary charge receiver which accumulates a number of the charges. However, the material guide has further advantages when used to dispense charge of material onto a moving charge receiver. The charge receiver may be of various different forms and may, for example, be a deep or shallow cup-like receptacle, a relatively flat tray, a flat sheet of material such as wrapping paper or the like, or even a moving conveyor shaped to support the charges of material when they are deposited thereon. The path and direction of movement of the orbiting material guide is advantageously arranged so that the material guide moves downwardly toward the charge receiver, and in the direction of movement of the charge receiver during the time that the charges of material are being cut from the web, so as to minimize the free fall of the charge after it is severed from the web. The charge receiver is advanced along a generally horizontal path by a conveyor designated generally by the numeral 30. The conveyor 30 may be of various different constructions, depending in large part on the type of receiver being used. When the receivers are in the form of generally cup-like receptacles, as shown in FIGS. 1–9, then the conveyor 30 is advantageously constructed and arranged to advance the receptacles in timed relation with the orbital movement of the material guide, so that the dispensing apparatus will dispense successive charges of material into successive receptacles. One conveyor apparatus and drive therefor suitable for moving receptacles in timed relation with the operation of the material guide, is described hereinafter.

A cutter is interposed in the path of movement of the web from the material guide, as the material guide moves through the lower portion of its orbital path, to sever a charge of material from the web. For most semi-solid materials, this cutter is preferably in the form of a wire-like element designated 32. The cutter could be fixedly supported at a level below the lowermost point of travel of the material guide, to extend crosswise of the web as the material guide moves in its orbital path and sever a charge of material therefrom. However, the line of severance between the charge and the web would be arcuate since the material guide is moving in an arcuate path. It is accordingly advantageous to support the cutting element 32 against substantial horizontal movement while permitting limited vertical movement, and then guiding the cutter during movement across the material guide in such a manner as to form the desired shape of the end cut on the charge. As best shown in FIGS. 1 and 9, the cutter element 32 is supported on a yoke-type support member 34, which support member is swingably mounted on a pin 35. The pin 35 is mounted on journals 36 carried by a support bracket 37 and a stop and spring mechanism is provided for limiting vertical swinging movement of the support 34 and for yieldably urging the cutter element 32 to a preselected raised position. As shown, the stop and spring mechanism includes a stud 41 attached to the bracket 37 and an adjustable lower stop mounted on the stud. The cutter support 34 has an opening which loosely receives the stud 41 and a spring 45 is interposed between the support 34 and an adjustable nut 46 to yieldably urge the cutter to a raised position such as shown in FIGS. 3 and 4, in which the cutter 32 is disposed at a level substantially above the lowermost point in the path of travel of the discharge end of the material guide. The cutter can yieldably move downward against the bias of the spring 45, and a cutter guide 48 is provided on the material guide for movement therewith, and which cutter guide engages the cutter to move the cutter vertically with the material guide while the cutter is moving crosswise of the web. With this arrangement, the shape of the cut is determined by the guide 48. Since the web of material is continuously advancing through the material guide, and will continue to advance during movement of the cutter crosswise of the material guide, the cutter guide 48 is preferably shaped to compensate for the movement of the web during severance of the charge therefrom. As shown in the drawings, the cutter guide is formed directly on the lower end of the material guide and disposed at an angle to a plane normal to the axis of the material guide 15 and this angle is correlated with the rate of movement of the material through the material guide and the rate of movement of the material guide crosswise of the cutter so that the cut will extend substantially normal to the axis of the material as it is severed from the web. In other words, the angle designated $a$ in FIG. 3 is preferably substantially equal to the angle whose tangent is the rate of feed of material through the material guide divided by the rate of movement of the material guide crosswise of the cutter. As will be seen, the length of the arm must be made sufficiently long, with relation to the cross-section of the material guide, so as to produce a horizontal movement substantially greater than the width of the material guide measured in the direction of movement thereof, so as to move the material guide completely across the cutter during the lower portion of the path of travel of the material guide. The guide 48 is advantageously formed directly on the end of the material guide and, as shown, includes a lip 48' that projects laterally from the material guide to engage the cutter and guide the same below the guide edge 48.

The method and apparatus for dispensing discrete charges of material may be employed with various different types of filling machines and may, for example, be employed with filling machines having straight line conveyors as well as circular conveyors. In the embodiment shown in FIGS. 1 and 2, the dispensing apparatus as shown applied to a filling machine of the type disclosed in the patent to Anderson and Heifetz, No. 2,863,271. This filling machine has a drive mechanism for operating the conveyor and filler in timed relation and, in addition, permits vertical adjustment of the filler with respect to the conveyor so as to enable adjustment of the spacing between the material guide and the charge receiver at the time the charge is severed from the web of material. Reference is hereby made to the aforementioned Anderson patent for a more complete description of the construction and operation of the filling machine. In general, the filling machine includes a central housing 51 which is non-rotatably, but vertically adjustably, supported on a frame 52 to enable vertical adjustment of the spacing between the filling mechanism and the conveyor. The housing 51 has a base plate 53 attached to a sleeve 54. The sleeve is held against rotation by a key 55 and is vertically adjusted relative to the support frame by a worm 57 and worm wheel 56 that threadedly engages the sleeve. A drive shaft 58 extends upwardly through the sleeve and is driven by a suitable motor and speed reducer 59 and 60 diagrammatically shown in FIG. 2.

The conveyor 30 includes a support platform 61 and a star wheel 62 rotatably supported on the central housing 51. The star wheel 62 has a ring gear 63 thereon which is drivingly connected through intermediate gears 67' to a drive gear 67 on the shaft 58.

The crankshafts 25 and 26 are rotatably supported in the central housing 51 about vertically offset axes and a means such as gears 64, 65 and 66, are provided for effecting rotation of the shafts 25 and 26 in timed relation with each other. These chankshafts correspond generally to those employed in the aforementioned patent for operating the capper. One of the shafts 26 is drivingly connected through bevel gearing 68 and 69 to the drive shaft 58 so as to rotate the cranks 21 and 22 in timed relation with the movement of the conveyor. The gearing 68, 69 and the gearing 67, 67', 63 for driving the dispenser and star wheel respectively is selected to move the dispenser nozzle at the desired speed relative to the conveyor 30. In the particular filling machine illustrated, the star wheel has twelve pockets and the gearing is selected so as to move the material guide through one orbit in the time required to index the conveyor one-twelfth of one revolution. When dispensing charges of material into relatively deep cup-like receptacles as shown in FIGS. 1–9, it is advantageous to time the movement of the receptacles relative to the movement of the material guide so that the charge will move horizonally in the same direction as the receptacle and will accurately register therewith at the time the material guide is in its lowermost position. Moreover, the receiver and material guide are preferably vertically adjusted relative to each other so that the charge is spaced a minimum distance from the receptacle at the time it is severed from the web to minimize the free fall of the charge. As shown, in the several moved positions in FIGS. 3–8, the web is continuously extruded from the material guide as the material guide moves upwardly and rearwardly from the position shown in FIG. 3 to the position shown in FIG. 4 and while the material guide is moving downwardly and rearwardly as shown in FIG. 5. As the material guide approaches its lower position, as shown in FIG. 6, the cutter element 32 engages the cutter guide 48 on the end of the material guide and, as the material guide moves through the lower portion of its orbital path, the cutter moves crosswise of the web along a path determined by the guide edge 48, to sever the charge from the web. As will be seen, the cutter 32 does not interrupt or otherwise interfere with the continuous flow of material from the material guide and, during the cutting operation, the material continues to flow from the material guide. The angle of the cutter 48 is related to the rate of flow and the rate of movement of the material guide crosswise of the cutter so as to form end faces on the charge which extend substantially perpendicular to the axis of the charge. Since the material guide is moving in the same direction as the receiver during severance of the charge from the web, the vertical spacing between the conveyor and the material guide can be adjusted so that the lower edge of the web extends closely adjacent and preferably downwardly into the receptacle, prior to complete severance of the charge of material from the web. Obviously, if the container is made relatively wide as compared to the cross section of the charge of material, the web can be arranged to extend even closer to the bottom of the receptacle prior to severance of the charge from the web.

Figure 2:
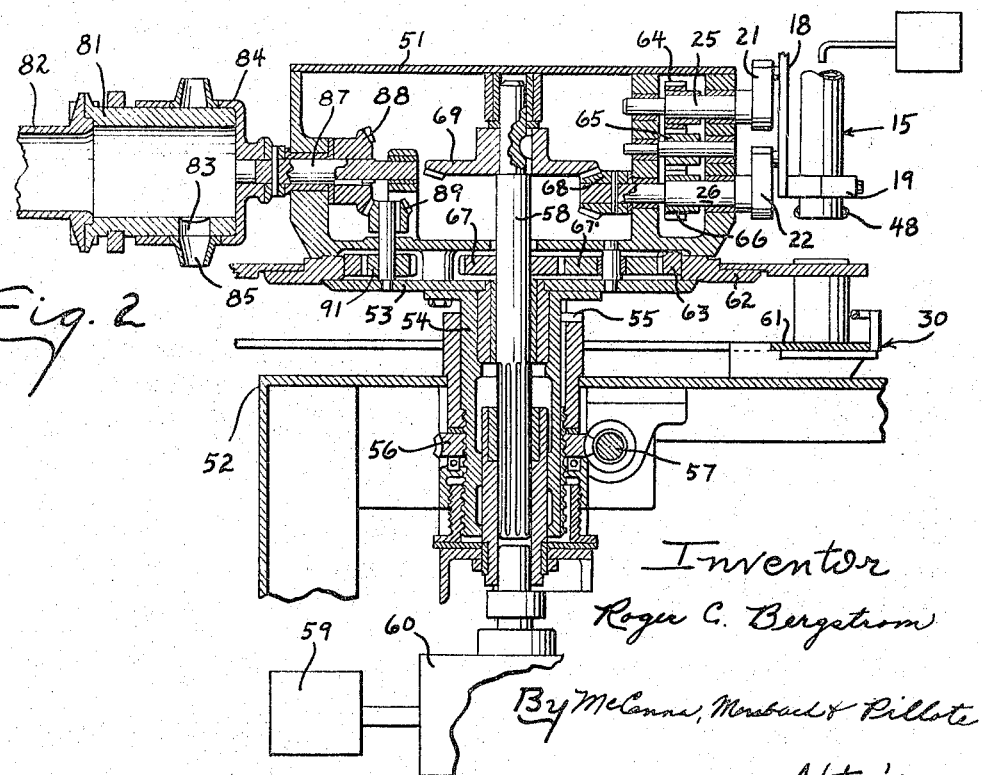
FIG. 2 is a sectional view through the filling machine.

The dispensing method and apparatus can be used for dispensing a wide variety of different materials and into a wide variety of different packages and receivers. Thus, as shown in FIGS. 1–9, it is arranged to dispense a discrete charge of material into a cup-shaped receiver, which charge has a cross-section smaller than the receptacle. The receptacle can then be closed or sealed in a conventional manner or, alternatively, a second product can be dispensed into the receptacle either prior to or subsequent to the dispensing of the charge therein. As shown in FIGS. 1 and 2, and as disclosed in the aforementioned patent, the filling machine employs a dispenser nozzle including a stationary member 81 adapted for connection through a line 82 to a source of material. The stationary member 81 has a downwardly facing port 83 and a rotary nozzle in the form of a sleeve 84 having nozzle members 85 is disposed around the member 81. The rotary nozzle is connected through a shaft 87 and is drivingly connected as through bevel gearing 88, 89 and spur gear 91, to the star wheel conveyor to be rotated in timed relation therewith. This second nozzle is also more fully disclosed in the aforementioned Anderson application and reference is made to that application for a more complete description of the construction and operation of the nozzle. The nozzle can be used to dispense different materials into the cup, either before or after the charge of material is disposed thereinto. For example, if the charge of material is a frozen type confection, the nozzle 81 can be used to dispense a syrup onto the charge of frozen confection or, alternatively, to dispense a different flavored frozen confection to completely fill the cup, if desired. In this manner, the package will contain a core comprising the charge previously mentioned and which core is surrounded by a different material.

The size of the charge being dispensed can be varied widely between a relatively tall charge as shown in FIGS. 1–9, and a relatively flat shallow charge, as shown in FIG. 10. Thus, the dispensing method and apparatus could be used in forming ice cream bars by suitably shaping the material guide 115 to form a web having an outline such as a rectangular outline conforming to that of the bar, and by using the cutter element 132 for cutting off relatively thin sections from the web as shown in FIG. 10.

The apparatus could also be used for dispensing other materials, such as cookie dough, mashed potatoes, etc., onto a tray or other type receiver. If desired, a tamping apparatus designated generally by the numeral 100 and operated by cranks 101 could be provided for flattening or impressing a suitable design onto the dispensed articles. The charge receiver need not be a cup-shaped receptacle or tray, and may be in the form of flat sheets or even a continuous strip of paper 103 or other suitable support which is advanced by a conveyor 104.

From the foregoing it will be seen that the dispensing apparatus is adapted for dispensing a wide variety of materials. Since the material guide moves in a vertically disposed orbital path, it cyclically moves toward and away from the conveyor or charge receiver and, as it approaches the conveyor, it moves in the same direction as the conveyor. By suitably adjusting the space between the material guide and the charge receiver, the free fall of the charge after it is severed from the web can be minimized to avoid distortion of the charge as it is dropped on to the receiver and to facilitate accurate positioning of the charge on the receiver. As the material guide moves through its orbital path, it moves crosswise of the cutter 32 to sever a charge of material from the web. The web continues to flow from the material guide during the cutting and the cutter is guided crosswise of the material guide in such a manner as to compensate for the movement of the web from the material guide during the cutting operation and produce a substantially perpendicular cut. The material continues to flow from the material guide after the charge is separated therefrom and the material guide is raised upwardly and then moved in a direction opposite the direction of advance of the conveyor back to a position to cut a succeeding charge of material from the web. With this arrangement, the cutter does not interfere with movement of the web back to its initial position.

I claim:

1. An apparatus for dispensing discrete charges of material comprising, a material guide having a discharge opening, means for feeding material through the material guide to feed a strip of material from the discharge opening, means for moving said material guide in a generally upright orbital path while maintaining the discharge opening facing generally downwardly to feed the strip of material downwardly, and a cutter positioned to intersect the path of movement of the discharge end of the material guide as the material guide moves through the lower portion of said orbital path to sever a charge of material from the strip.

2. An apparatus for dispensing discrete charges of material comprising, a dispenser having a tubular material guide terminating in a discharge opening at one end, means for feeding semi-solid material to the material guide to extrude a web of material from the discharge opening, means for moving the material guide in an orbital path while maintaining the axis of said material guide in a preselected direction, a cutter, means mounting the cutter in the path of movement of the material guide to sever a charge of material from the web, said cutter mounting means supporting the cutter against movement in a direction transverse to the axis of the material guide while permitting movement in a direction axially of the material guide, and cutter guide means movable with the material guide and engageable with the cutter to move the same in a direction axially with the material guide as the material guide moves across the cutter.

3. The combination of claim 2 wherein said cutter guide means is inclined to the axis of said cutter to compensate for movement of the web out of the material guide during cutting of the charge from the web.

4. An apparatus for dispensing discrete charges of material comprising, means for advancing a charge receiver in one direction along a generally horizontal path, a dispenser having a tubular material guide terminating in a discharge opening at one end, means for feeding semi-solid material to the material guide to extrude a web of material from the discharge opening, means for moving the material guide in a generally upright orbital path while maintaining the axis of said material guide in a generally upright position, said material guide moving means moving the material guide in said one direction during that portion of the orbital path that the material guide is closest to the receiver and moving said material guide in the opposite direction during that portion of the orbital path that the material guide is spaced farthest from the receiver, and cutter means mounted to extend crosswise of the path of movement of the web of material when the material guide is moving in said one direction to sever a charge of material from the web.

5. An apparatus for dispensing discrete charges of semi-solid material comprising, means for advancing a charge receiver in one direction along a generally horizontal path, a dispenser having a tubular material guide terminating in a discharge opening at one end, means for feeding semi-solid material to the material guide to extrude a web of material from the discharge opening, means for moving the material guide in a generally upright orbital path while maintaining the axis of said material guide in a generally upright position, said material guide moving means moving the material guide in said one direction during that portion of the orbital path that the material guide is closest to the receiver and moving said material guide in the opposite direction during that portion of the orbital path that the material guide is spaced farthest from the receiver, a cutter, means mounting the cutter in the path of movement of the material guide to sever a charge of material from the web, said cutter mounting means supporting the cutter for limited vertical movement, and cutter guide means movable with the material guide and engageable with the cutter to move the same vertically with the material guide as the material guide moves across the cutter.

6. An apparatus for dispensing discrete charges of semi-solid material comprising, means for advancing a charge receiver in one direction along a generally horizontal path, a dispenser having a tubular material guide terminating in a discharge opening at one end, means for feeding semi-solid material to the material guide to extrude a web of material from the discharge opening, means for moving the material guide in a generally upright orbital path while maintaining the axis of said material guide in a generally upright position, said material guide moving means moving the material guide in said one direction during that portion of the orbital path that the material guide is closest to the receiver and moving said material guide in the opposite direction during that portion of the orbital path that the material guide is spaced farthest from the receiver, a cutter, means mounting the cutter in the path of movement of the material guide to sever a charge of material from the web, said cutter mounting means supporting the cutter for limited vertical movement, and cutter guide means movable with the material guide and engageable with the cutter to move the same vertically with the material guide as the material guide moves across the cutter, said guide means being inclined with respect to a plane normal to the axis of the material guide and in the direction of movement of the web.

7. The combination of claim 6 wherein said means for moving said material guide includes a pair of cranks mounted for rotation about vertically spaced axes.

8. An apparatus for dispensing discrete charges of semi-solid material comprising, means for advancing a charge receiver in one direction along a generally horizontal path, a dispenser having a tubular material guide terminating in a discharge opening at one end, means for feeding semi-solid material to the material guide to extrude a web of material from the discharge opening, means for moving the material guide in a generally upright orbital path while maintaining the axis of said material guide in a generally upright position, said material guide moving means moving the material guide in said one direction during that portion of the orbital path that the material guide is closest to the receiver and moving said material guide in the opposite direction during that portion of the orbital path that the material guide is spaced farthest from the receiver, a cutter including a generally horizontally disposed wire-like element extending crosswise of the path of movement of said material guide when the material guide is moving in said one direction to sever a charge of material from said web, a support member for supporting said element, means swingably mounting said support member for limited vertical movement of said element, cutter guide means movable with said material guide and engageable with said element to move the same vertically with the material guide as the material guide moves across the element, and means yieldably urging the support member in a direction to press the element against the cutter guide means.

9. An apparatus for dispensing discrete charges of material comprising, a material guide having a downwardly directed discharge opening, means for feeding material through the material guide to extrude a web of material from the discharge opening, a driving mechanism for moving the material guide cyclically around a path in which it has horizontal and vertical components of movement, the horizontal component being in one direction at the bottom of the path and in an opposite direction at the top of the path, a cutter mechanism mounted in the path of movement of the web so that it severs a charge of material from the web as the material guide moves with its horizontal component at the bottom of its path, and a charge receiver located below the material guide to receive the charge as it is severed from the web.

10. An apparatus according to claim 9 including means for moving said charge receiver in said one direction as said material guide moves with its horizontal component in said one direction.

11. An apparatus for dispensing discrete charges of semi-solid material comprising, means for advancing a charge receiver in one direction along a generally horizontal path, a dispenser having a tubular nozzle portion terminating in a discharge opening at one end, means for feeding semi-solid material to the nozzle portion to extrude a web of material from the discharge opening, means for moving the nozzle portion in a generally upright orbital path while maintaining the axis of said nozzle portion in a generally upright position, said nozzle moving means moving the nozzle portion in said one direction during that portion of the orbital path that the nozzle portion is closest to the receiver and moving said nozzle portion in the opposite direction during that portion of the orbital path that the nozzle portion is paced farthest from the receiver, cutter means mounted to extend crosswise of the path of movement of the web of material when the nozzle is moving in said one direction to sever a charge of material from the web, tamping means for impressing the charge of material after it is deposited on the receiver, and means for moving the tamping means into and out of engagement with the charge of material on the receiver.

12. The combination of claim 11 wherein said means for moving said tamping means moves the same in a generally upright orbital path.

References Cited by the Examiner

UNITED STATES PATENTS

| | | | |
|---|---|---|---|
| 2,055,605 | 9/1936 | Jensen | 107—28 |
| 2,579,096 | 12/1951 | Schulz | 107—14 X |
| 2,838,013 | 6/1958 | Weidenmiller et al. | 107—29 |
| 2,863,271 | 12/1958 | Anderson et al. | 53—276 |
| 3,166,025 | 1/1965 | Hulse | 107—28 X |

WILLIAM I. PRICE, *Primary Examiner.*